UNITED STATES PATENT OFFICE.

JOHN LEONARD KELLOGG, OF BATTLE CREEK, MICHIGAN, ASSIGNOR TO KELLOGG TOASTED CORN FLAKE COMPANY, OF BATTLE CREEK, MICHIGAN, A CORPORATION OF MICHIGAN.

MANUFACTURE OF BEVERAGE EXTRACTS.

1,189,131.   Specification of Letters Patent.   Patented June 27, 1916.

No Drawing.   Application filed December 18, 1915.   Serial No. 67,507.

*To all whom it may concern:*

Be it known that I, JOHN LEONARD KELLOGG, a citizen of the United States, residing in Battle Creek, in the county of Calhoun and State of Michigan, have invented a new and useful Improvement in the Manufacture of Beverage Extracts, (Case L,) of which the following is a specification.

My invention relates in general to the manufacture of beverage extracts quickly soluble in water from the algarroba bean, in combination with starch-bearing materials, such as wheat, corn, rye, barley and other cereals, beans, peas, nuts, taro and arrow root. These extracts are intended to be dissolved in water to be used as a healthful beverage in place of coffee or other beverages less healthful.

In two prior similarly entitled applications for patents executed by me on September 13, 1915, filed and distinguished as Cases I and K respectively, I have described and broadly claimed the manufacture of a soluble extract from roasted algarroba bean and a roasted cereal or other starch-bearing material. In performing the specific process described in said applications as the preferred method of making said extract, I caramelized an extract made from the roasted and comminuted algarroba bean, mixed said caramelized extract with, by preference, roasted wheat bran, then combined this mixture with a roasted and comminuted cereal, preferably a mixture of wheat and rye, and finally extracted and dried as usual the soluble contents of the whole mixture. In the performance of my present invention, I prefer also to make and caramelize an extract of roasted and comminuted algarroba bean as described in said prior applications. I also prefer in the present invention, to make an extract or extracts, in the usual way, of roasted and comminuted bran, wheat, rye or other cereals or starch-bearing materials, such as those mentioned above. I then blend and mix the caramelized algarroba bean extract and the roasted cereal or other starchy matter extract together, and dry them into a solid soluble powder as usual. I have also discovered that by substituting for a part or all of the cereals or other starch-bearing material, the soja or soy bean, a superior product is obtained.

In the present preferred method of carrying my invention into practice, the algarroba beans in sufficient quantity are first thoroughly washed and dried, roasted and ground into a coarse powder. The pulverized, dried and roasted algarroba beans are then steeped in hot water and all the extractive material is washed from the product by means of percolation. The extract is then evaporated to a thick syrup, preferably in a vacuum drier, to a density of 30° to 40° B. This syrup is then caramelized by the usual methods until it has a bitterish sweet flavor and is of a very dark color, similar to the color found in commercial caramel. A sufficient quantity of wheat, rye, the soja or soy bean, or other starch-bearing material, such as those above-mentioned or any of them, or a mixture of the same in any desired proportions, is then roasted and ground, mixed with water and the extractive matter extracted therefrom by percolation in the usual way. A sufficient quantity of preferably roasted wheat bran is then dried, roasted to a dark golden brown color, and the extractive matter obtained therefrom by percolation with water in the usual way. One part of the caramelized algarroba extract is then mixed and blended, by preference with two parts of the roasted wheat or other starchy matter extract, and one-quarter part of the roasted bran extract. This mixture of extracts is then placed in a vacuum drier and dried to a solid soluble powder in the usual way.

The resulting product is quickly soluble in water, is very palatable and healthful, has the general flavor and characteristics of coffee, and is in other respects an improved coffee substitute.

I am aware that United States patents to Gale No. 48,268, dated June 20, 1865, and to Barotte No. 439,318, dated October 28, 1890, describe a soluble coffee powder produced by evaporation in the ordinary way from an ordinary decoction, extract or solution of coffee.

I claim as my invention:

1. The process of making a solid soluble beverage extract which comprises roasting and comminuting algarroba beans, and extracting, concentrating and caramelizing the soluble contents thereof; roasting and comminuting other starch-bearing material, and extracting and concentrating the soluble contents thereof; mixing the caramelized algarroba extract and the starchy matter extract together, and evaporating the mixture of extracts to dryness.

2. The process of making a solid soluble beverage extract which comprises roasting and comminuting algarroba beans, and extracting, concentrating and caramelizing the soluble contents thereof; roasting and comminuting other starch-bearing material, and extracting and concentrating the soluble contents thereof; roasting and comminuting bran and extracting and concentrating the soluble contents thereof; mixing the caramelized algarroba extract, the starchy matter extract, and the bran extract together, and evaporating the mixture of extracts to dryness.

3. The process of making a solid soluble beverage extract which comprises roasting and comminuting algarroba beans and extracting, concentrating and caramelizing the soluble contents thereof; roasting and comminuting starch-bearing material containing soy beans and extracting and concentrating the soluble contents thereof; mixing the caramelized algarroba extract and the extract of starchy matter containing soy beans together, and evaporating the mixture of extracts to dryness.

4. The process of making a solid soluble beverage extract which comprises roasting and comminuting algarroba beans, and extracting, concentrating and caramelizing the soluble contents thereof; roasting and comminuting starch-bearing material containing soy beans and extracting and concentrating the soluble contents thereof; roasting and comminuting bran and extracting and concentrating the soluble contents thereof; mixing the caramelized algarroba extract, the extract of the starchy matter containing soy beans, and the bran extract together, and evaporating the mixture of extracts to dryness.

5. A soluble beverage extract comprising in its composition the extractive matter of a concentrated and caramelized extract of roasted algarroba beans and of roasted soy beans.

6. A soluble beverage extract comprising in its composition the extractive matter of a concentrated and caramelized extract of roasted algarroba beans, roasted soy beans and roasted bran.

JOHN LEONARD KELLOGG.